United States Patent
Zhou et al.

(10) Patent No.: US 8,514,531 B1
(45) Date of Patent: Aug. 20, 2013

(54) TRIP UNIT PROVIDING SHORT CIRCUIT ZONE LOCATION DETECTION, ELECTRICAL SWITCHING APPARATUS AND SYSTEM INCLUDING THE SAME

(75) Inventors: Xin Zhou, Franklin Park, PA (US); Engelbert Hetzmannseder, Moon Township, PA (US)

(73) Assignee: Eaton Corporation, Cleveland, OH (US)

(*) Notice: Subject to any disclaimer, the term of this patent is extended or adjusted under 35 U.S.C. 154(b) by 7 days.

(21) Appl. No.: 13/419,776

(22) Filed: Mar. 14, 2012

(51) Int. Cl.
*H02H 3/00* (2006.01)

(52) U.S. Cl.
USPC ............................. 361/42; 361/62

(58) Field of Classification Search
USPC ............................. 361/42, 44, 62
See application file for complete search history.

(56) References Cited

U.S. PATENT DOCUMENTS

| | | | |
|---|---|---|---|
| 1,957,204 A | 5/1934 | Fitz Gerald | |
| 5,905,616 A | 5/1999 | Lyke | |
| 7,411,403 B2 | 8/2008 | Zhou | |
| 2008/0198521 A1 | 8/2008 | Weiher et al. | |
| 2008/0204950 A1* | 8/2008 | Zhou et al. | 361/42 |
| 2009/0161270 A1* | 6/2009 | Beatty et al. | 361/42 |

FOREIGN PATENT DOCUMENTS

GB 330658 A 6/1930

OTHER PUBLICATIONS

European Patent Office, "International Search Report and Written Opinion", Jun. 12, 2013, 10 pp.

* cited by examiner

*Primary Examiner* — Danny Nguyen
(74) *Attorney, Agent, or Firm* — Eckert Seamans Cherin & Mellott, LLC; Kirk D. Houser

(57) ABSTRACT

A trip unit includes a current sensor to sense a value of current flowing through a conductor, a circuit to receive first frequency pulses having a number of first frequencies from the conductor, a transmitter to transmit second frequency pulses having a second frequency different than the first frequencies to the conductor, and a processor having a routine. The routine inputs the sensed value of current from the current sensor, determines if the sensed value of current exceeds a predetermined value and responsively causes the transmitter to transmit the second frequency pulses having the second frequency to the conductor, monitors within a predetermined time after determining that the sensed value of current exceeds the predetermined value if a number of the first frequency pulses having the number of first frequencies is received by the circuit, and responsively delays outputting a trip signal, and, otherwise, immediately outputs the trip signal.

21 Claims, 2 Drawing Sheets

TRIP UNIT PROVIDING SHORT CIRCUIT ZONE LOCATION DETECTION, ELECTRICAL SWITCHING APPARATUS AND SYSTEM INCLUDING THE SAME

BACKGROUND

1. Field

The disclosed concept pertains generally to electrical switching apparatus and, more particularly, to trip units providing zone interlocking for such apparatus. The disclosed concept further pertains to electrical switching apparatus providing zone interlocking. The disclosed concept also pertains to systems providing zone interlocking.

2. Background Information

Circuit interrupters, such as for example and without limitation, circuit breakers, are used to protect electrical circuitry from damage due to an overcurrent condition, such as an overload condition, a short circuit, or another fault condition, such as an arc fault or a ground fault. Molded case circuit breakers typically include a pair of separable contacts per phase. The separable contacts may be operated either manually by way of a handle disposed on the outside of the case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Typically, two or more circuit interrupters are placed between a fault and the source of the fault current. In order to minimize electrical service interruption, the circuit interrupters are selective in response such that the one nearest the fault will first attempt to interrupt the fault current. If this circuit interrupter does not timely clear the fault, then the next upstream circuit interrupter will attempt to do so, and so on. This response selectivity is sometimes termed system selective coordination.

Zone selective interlocking (ZSI) (e.g., also known as "zone interlocking") is a method of controlling circuit interrupters in order to provide selectivity with relatively very short delay times, irrespective of the number of zones (e.g., without limitation, a line side zone; a load side zone; a number of upstream zones; a number of downstream zones; a number of grading levels) and the location of a fault in a power distribution system. A ZSI input (ZSI_IN) and a ZSI output (ZSI_OUT) are provided at each circuit interrupter. Interlocking may be applied to faults between phases or earth-faults or both.

As one example, zone interlocking uses a ZSI_OUT/ZSI_IN communication scheme to connect line and load circuit interrupter trip units together. When a fault occurs, the trip units communicate using a ZSI_OUT/ZSI_IN hardwired connection to determine which load side circuit interrupter is closest to the fault. The trip unit in the circuit interrupter closest to the fault overrides any customer-defined delay and opens instantaneously, thereby clearing the fault and allowing the line side circuit interrupters to remain closed.

If ZSI is used in several zones, then each circuit interrupter affected by, for example, a short circuit current (i.e., upstream of the fault) interrogates the circuit interrupter(s) directly downstream of that affected circuit interrupter to determine whether the short circuit current is present in or is affecting the adjacent downstream zone. A delay setting $t_{ZSI}$ is adjusted at each circuit interrupter to ensure that the downstream circuit interrupter, directly upstream of the fault, has time to interrupt the fault current. The advantages of ZSI increase with additional zones, since time-based selectivity can result in unacceptably long delays at the upstream power source end of the system.

Each of the circuit interrupters in a distribution system is typically sized in order that they can achieve selective coordination. More often than not, upstream circuit interrupters have to be oversized.

Although the use of ZSI_IN and ZSI_OUT signals help to accomplish certain aspects of coordination, they require hardwiring between downstream and upstream circuit interrupters.

There is a need for short circuit zone location detection that allows circuit interrupters to act autonomously.

There is room for improvement in trip units for electrical switching apparatus.

There is also room for improvement in electrical switching apparatus.

There is further room for improvement in systems including electrical switching apparatus.

SUMMARY

These needs and others are met by embodiments of the disclosed concept, for which a routine of a trip unit processor is structured to input a sensed value of current from a current sensor, determine if the sensed value of current exceeds a predetermined value and responsively cause a transmitter to transmit second frequency pulses having a second frequency to a conductor, monitor within a predetermined time after determining that the sensed value of current exceeds the predetermined value if a number of first frequency pulses having a number of first frequencies is received by a circuit from the conductor, and responsively delay outputting a trip signal, and, otherwise, immediately output the trip signal.

In accordance with one aspect of the disclosed concept, a trip unit comprises: a current sensor structured to sense a value of current flowing through a conductor; a circuit structured to receive first frequency pulses having a number of first frequencies from the conductor; a transmitter structured to transmit second frequency pulses having a second frequency to the conductor, the second frequency being different than the number of first frequencies; and a processor comprising a routine structured to input the sensed value of current from the current sensor, determine if the sensed value of current exceeds a predetermined value and responsively cause the transmitter to transmit the second frequency pulses having the second frequency to the conductor, monitor within a predetermined time after determining that the sensed value of current exceeds the predetermined value if a number of the first frequency pulses having the number of first frequencies is received by the circuit from the conductor, and responsively delay outputting a trip signal, and, otherwise, immediately output the trip signal.

As another aspect of the disclosed concept, an electrical switching apparatus comprises: separable contacts; an operating mechanism structured to open and close the separable contacts; a trip mechanism cooperating with the operating mechanism to trip open the separable contacts, the trip mechanism comprising: a current sensor structured to sense a value of current flowing through the separable contacts, a circuit structured to receive first frequency pulses having a number of first frequencies from a conductor in series with the separable contacts, a transmitter structured to transmit second frequency pulses having a second frequency to the conductor, the second frequency being different than the number of first frequencies, and a processor comprising a routine structured to input the sensed value of current from the current sensor, determine if the sensed value of current exceeds a predetermined value and responsively cause the transmitter to transmit the second frequency pulses having the second frequency to the conductor, monitor within a predetermined time after determining that the sensed value of current exceeds the predetermined value if a number of the first frequency pulses having the number of first frequencies is received by the circuit from the conductor, and responsively delay outputting a trip signal, and, otherwise, immediately output the trip signal.

As another aspect of the disclosed concept, a system comprises: a first branch level comprising a number of first electrical switching apparatus; and a second branch level downstream of the first branch level and comprising a number of second electrical switching apparatus, wherein each of the number of first electrical switching apparatus and the number of second electrical switching apparatus comprises: separable contacts, an operating mechanism structured to open and close the separable contacts, and a trip mechanism cooperating with the operating mechanism to trip open the separable contacts, the trip mechanism comprising: a current sensor structured to sense a value of current flowing through the separable contacts, a circuit structured to receive first frequency pulses having a number of first frequencies from a conductor in series with the separable contacts, a transmitter structured to transmit second frequency pulses having a second frequency to the conductor, the second frequency being different than the number of first frequencies, and a processor comprising a routine structured to input the sensed value of current from the current sensor, determine if the sensed value of current exceeds a predetermined value and responsively cause the transmitter to transmit the second frequency pulses having the second frequency to the conductor, monitor within a predetermined time after determining that the sensed value of current exceeds the predetermined value if a number of the first frequency pulses having the number of first frequencies is received by the circuit from the conductor, and responsively delay outputting a trip signal, and, otherwise, immediately output the trip signal, wherein each corresponding one of the number of first electrical switching apparatus is structured to transmit the second frequency pulses having a same second frequency to the conductor of the corresponding one of the number of first electrical switching apparatus, wherein each corresponding one of the number of second electrical switching apparatus is structured to transmit the second frequency pulses having a same second frequency to the conductor of the corresponding one of the number of second electrical switching apparatus, and wherein the same second frequency of the corresponding one of the number of first electrical switching apparatus is different than the same second frequency of the corresponding one of the number of second electrical switching apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a digital signal processor (DSP); a central processing unit; a mainframe computer; a mini-computer; a server; a networked processor; or any suitable processing device or apparatus.

As employed herein, the term "electrical conductor" shall mean a wire (e.g., solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with single-pole circuit breakers, although the disclosed concept is applicable to a wide range of electrical switching apparatus having any suitable number of poles.

Figure 1:
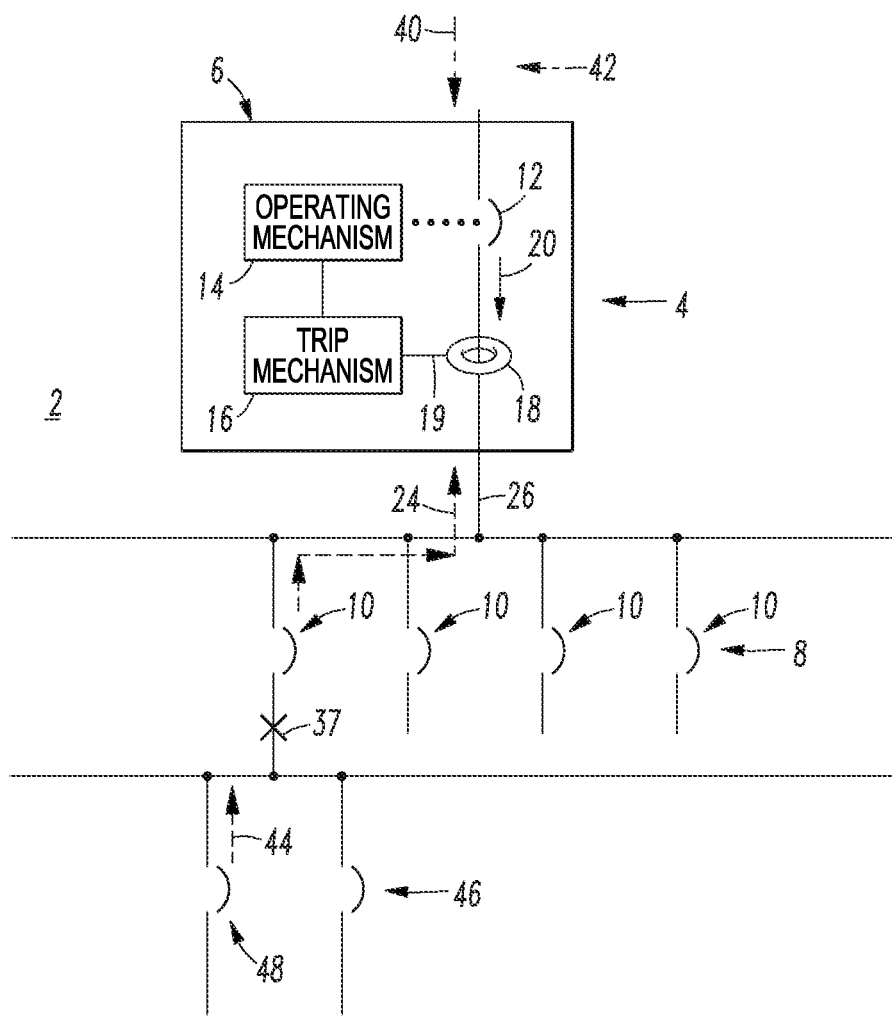
FIG. 1 is a block diagram of a system in accordance with embodiments of the disclosed concept.

FIG. 1 shows a system 2 including a first branch level 4 having a number of first electrical switching apparatus 6 (only one example circuit breaker 6 is shown) and a second branch level 8 downstream of the first branch level 4 and having a number of second electrical switching apparatus 10 (four example circuit breakers 10 are shown). As is conventional, as shown with the example circuit breaker 6, each of the number of first electrical switching apparatus 6 and the number of second electrical switching apparatus 10 includes separable contacts 12, an operating mechanism 14 structured to open and close the separable contacts 12, and a trip mechanism 16 cooperating with the operating mechanism 14 to trip open the separable contacts 12.

Figure 2:
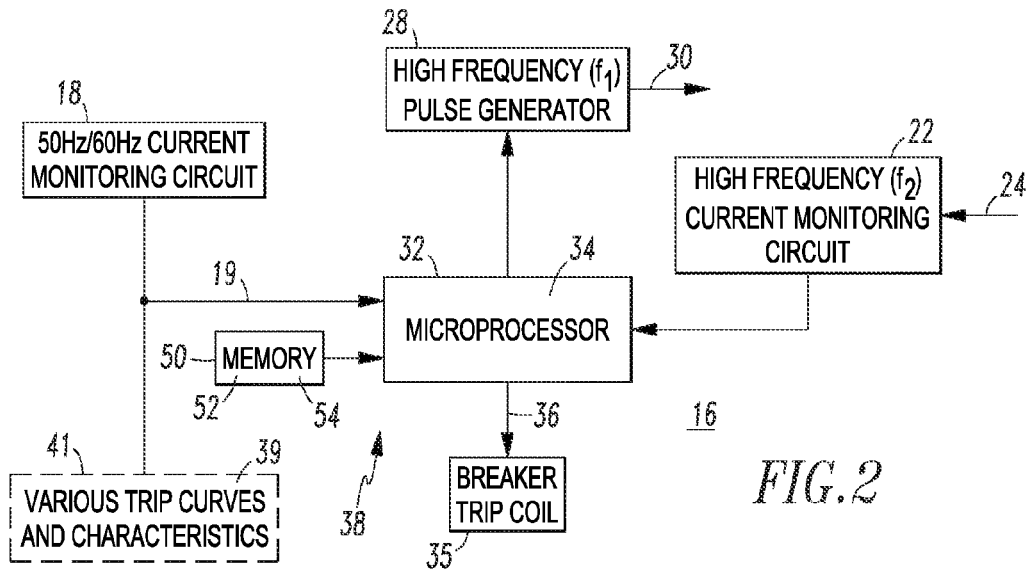
FIG. 2 is a block diagram of a circuit breaker trip unit in accordance with another embodiment of the disclosed concept.
Figure 3:
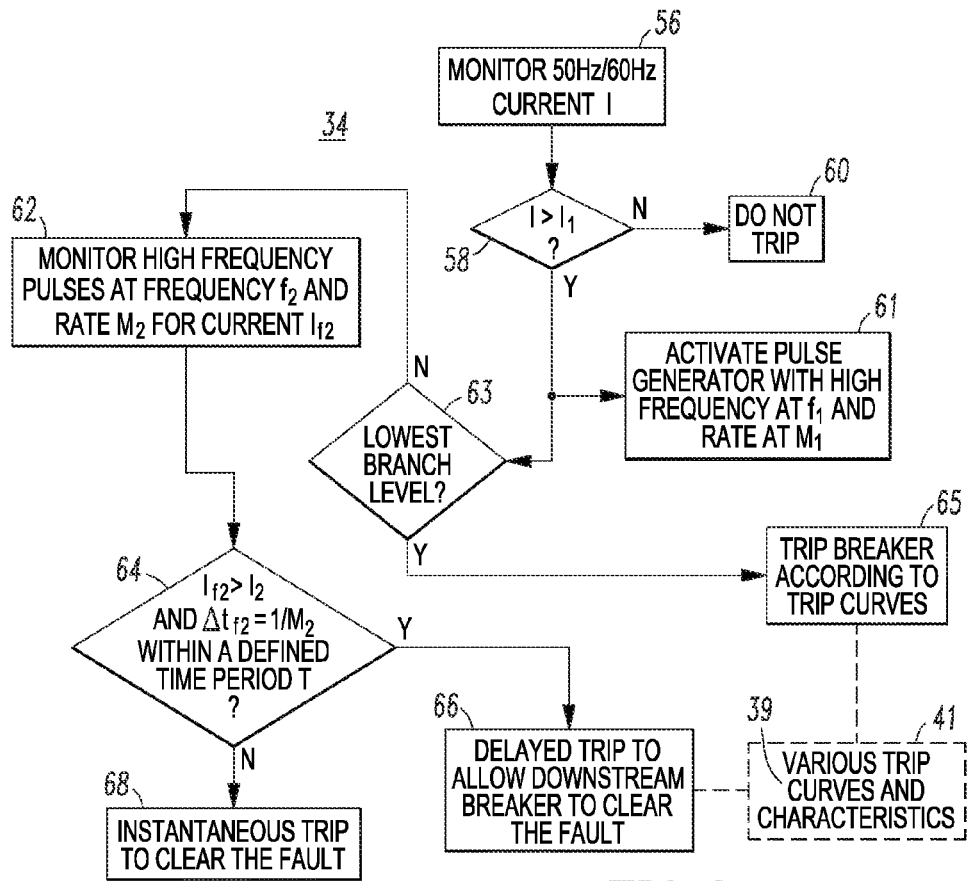
FIG. 3 is a flowchart of a routine of the processor of FIG. 2.

Also referring to FIG. 2, in accordance with aspects of the disclosed concept, the circuit breaker trip mechanism 16 includes a current sensor 18 structured to sense a value 19 of current 20 flowing through the separable contacts 12, a circuit 22 structured to receive frequency pulses 24 having a number of frequencies ($f_2$) from an electrical conductor 26 in series with the separable contacts 12, a transmitter 28 structured to transmit frequency pulses 30 having a frequency ($f_1$) different than the number of frequencies ($f_2$) to the conductor 26, and a processor, such as the example microprocessor (µP) 32 including a routine 34 (FIG. 3). The trip mechanism 16 provides an autonomous short circuit zone location detection trip circuit. The current sensor 18 is preferably a 50 Hz/60 Hz circuit that monitors the value 19 of the current 20 flowing through the separable contacts 12. The transmitter 28 is preferably a high frequency pulse generator that generates a series of high frequency pulses at frequency ($f_1$) and at rate ($M_1$). The circuit 22 is preferably a high frequency current monitoring circuit that monitors a high frequency current corresponding to a series of the high frequency pulses 24 at frequency ($f_2$) and at rate ($M_2$) originating from one of the number of second electrical switching apparatus 10. Frequencies $f_1$ and $f_2$ can be any suitably different frequencies, and rates $M_1$ and $M_2$ can be any suitably different rates.

The routine 34 of FIG. 3 is structured to input the sensed value (I) of current 19 from the current sensor 18 of FIG. 2, determine if the sensed value (I) of current 19 exceeds a predetermined value (e.g., $I_1$), and responsively cause the transmitter 28 to transmit the frequency pulses 30 having the different frequency ($f_1$) to the conductor 26, monitor within a predetermined time (T) after determining that the sensed value (I) of current 19 exceeds the predetermined value (e.g., $I_1$) if a number of the frequency pulses 24 having the number of frequencies ($f_2$) is received by the circuit 22 from the conductor 26, and responsively delay outputting a trip signal 36, and, otherwise, immediately output the trip signal 36. As is conventional, the trip signal 36, when output, energizes a circuit breaker trip coil 35, which causes the operating mechanism 14 to trip open the separable contacts 12. The predetermined value, $I_1$, is a value that is equal to the rated current value of the circuit breaker 6.

Each corresponding one of the number of first electrical switching apparatus 6 of FIG. 1 is structured to transmit the second frequency pulses 30 of FIG. 2 having a same second frequency to the conductor 26 of the corresponding one of the number of first electrical switching apparatus 6. Each corresponding one of the number of second electrical switching apparatus 10 is structured to transmit the second frequency pulses 30 having a same second frequency to the conductor 26 of the corresponding one of the number of second electrical switching apparatus 10. The same second frequency of the corresponding one of the number of first electrical switching apparatus 6 is different than the same second frequency of the corresponding one of the number of second electrical switching apparatus 10.

Electrical switching apparatus 10 in the same branch level, such as 8, will generate the same high frequency pulses, such as 24, but different from the high frequency pulses, such as 30, from electrical switching apparatus 6 in different branch levels, such as 4. As will be described in greater detail, below, in connection with FIG. 3, upon detection of a current exceeding the predetermined value (e.g., $I_1$), an electronic trip unit 38 of the electrical switching apparatus 6 will send the high frequency pulses 30 and also monitor within the predetermined time period (T) if there are high frequency pulses 24 coming from the electrical switching apparatus 10 in the next branch level 8 downstream. If not, the electrical switching apparatus 6 will trip immediately. Otherwise, the electronic trip unit 38 will switch its trip curve 39 (FIG. 2) to a delayed trip in order that the corresponding downstream electrical switching apparatus 10 can clear the fault 37 (FIG. 1). The trip curve 39 can be one of various trip curves and characteristics 41. For example, the routine 34 (FIG. 3) is structured to provide a number of short delay, long delay and instantaneous trip functions.

For example, the electronic trip unit 38 includes a first setting ($f_1$) of what frequency of pulses 30 to send and a second setting ($f_2$) of what frequency of pulses 24 come from the next branch level (e.g., 8) downstream. Hence, that electronic trip unit 38 would ignore different frequency pulses 40 (shown in phantom line drawing in FIG. 1) from upstream branch levels, such as 42 (shown in phantom line drawing in FIG. 1), or other different frequency pulses 44 (shown in phantom line drawing in FIG. 1) from still lower downstream branch levels, such as 46. Since the fault 37 is upstream of the electrical switching apparatus 48 of the lower downstream branch level 46, no action is needed by that apparatus.

If the electrical switching apparatus 48 is the lowest branch circuit level, as determined at 63 of FIG. 3, upon detection of a current exceeding the predetermined value (e.g., $I_1$) at 58, the electronic trip unit 38 of the electrical switching apparatus 48 will send high frequency pulses 30 at 61 and the electronic trip unit 38 will trip the electrical switching apparatus 48 at 65 according to the trip curve 39 (FIG. 2) to clear the fault downstream of the electrical switching apparatus 48. The trip curve 39 can be one of various trip curves and characteristics 41. For example, the routine 34 (FIG. 3) is structured to provide a number of short delay, long delay and instantaneous trip functions.

The example μP 32 of FIG. 2 includes a storage component, such as memory 50, having a number (e.g., one) of values 52 defining the number (e.g., one) of received frequencies ($f_2$), and another value 54 defining the transmitted frequency ($f_1$).

Referring to FIG. 3, the routine 34 determines whether the trip signal 36 of FIG. 2 is delayed or output immediately. At 56, the routine 34 monitors the 50 Hz/60 Hz current (I) from the circuit 18 of FIG. 2. Next, at 58, if the current (I) is not greater than the predetermined value ($I_1$), then no trip is actuated at 60. On the other hand, if the current (I) is greater than the predetermined value ($I_1$), then two steps are taken. At 61, the pulse generator 28 is activated to generate the series of high frequency pulses 30 at frequency ($f_1$) and rate ($M_1$). Also, at 63, it is determined if the circuit breaker is the lowest branch level. If so, then execution resumes at 65. Otherwise, at 62, using the circuit 22 of FIG. 2, high frequency pulses 24 are monitored at frequency ($f_2$) and rate ($M_2$) by sensing current ($I_{f2}$). Next, at 64, it is determined if the sensed current ($I_{f2}$) is greater than a predetermined value ($I_2$) and if the measured time ($\Delta t_{f2}$) between pulses is equal to $1/M_2$ within a predetermined time period T. If so, then at 66, a delayed trip allows the downstream circuit breaker (e.g., circuit breaker 10 of branch level 8 of FIG. 1) to clear the fault. If not, then an instantaneous trip is actuated at 68 to clear the fault 37.

Each circuit breaker frame has its own frequency $f_n$ and pulse rate $M_n$. Here, $f_2$ and $M_2$ define the high frequency pulses for the downstream circuit breaker, and $f_1$ and $M_1$ define the high frequency pulses for the upstream circuit breaker. Circuit breakers on the same level (e.g., intermediate level; lowest level) use the same frequency and the same pulse rate. There is only one circuit breaker at the highest or top level. The high frequency current $I_{f2}$ can be monitored by employing a suitable high frequency current sensor (e.g., without limitation, a current transformer (CT)) of the circuit breaker electronic trip unit 38. The example high frequency current sensor CT is tuned to a specific high frequency. Hence, the example top level circuit breaker 6 only monitors the high frequency signal(s) from the intermediate circuit breakers 10. The high frequency current $I_{f2}$ is the high frequency current caused by the pulse train of the $f_2/M_2$ defined high frequency pulses from the intermediate circuit breakers 10. The example top level circuit breaker 6 only transmits the local frequency $f_1$ and only receives the immediate downstream frequency $f_2$, but not a lower level frequency $f_3$. The predetermined values $I_1$ and $I_2$ are known by the top level circuit breaker 6.

EXAMPLE

As a non-limiting example for FIG. 3, the current I is 250 A, the predetermined value $I_1$ is 250 A (rated current), the frequency $f_1$ is 1.5 MHz, the rate $M_1$ is 25/mS, the frequency $f_2$ is 1 MHz, the rate $M_2$ is 20/mS, the predetermined value $I_2$ is 1 mA, and the time T is 500 μS. The predetermined time T corresponds to a predetermined count of the frequency pulses at frequency $f_2$ repeated at the rate $M_2$. In this example, the predetermined count is ten (e.g., 10×1/(20/mS)=10×50 μS=500 μS).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A trip unit comprising:
   a current sensor structured to sense a value of current flowing through a conductor;
   a circuit structured to receive first frequency pulses having a number of first frequencies from said conductor;
   a transmitter structured to transmit second frequency pulses having a second frequency to said conductor, said second frequency being different than said number of first frequencies; and
   a processor comprising a routine structured to input the sensed value of current from said current sensor, determine if the sensed value of current exceeds a predetermined value and responsively cause said transmitter to transmit the second frequency pulses having the second frequency to said conductor, monitor within a predetermined time after determining that the sensed value of current exceeds the predetermined value if a number of the first frequency pulses having the number of first frequencies is received by the circuit from said conductor, and responsively delay outputting a trip signal, and, otherwise, immediately output the trip signal.

2. The trip unit of claim 1 wherein said processor further comprises a storage component having a number of first values defining the number of first frequencies, and a second value defining the second frequency.

3. The trip unit of claim 1 wherein said number of first frequencies is a single first frequency; and wherein said processor further comprises a storage component having a single first value defining the single first frequency, and a second value defining the second frequency.

4. The trip unit of claim 1 wherein said trip unit has a rated current value; and wherein the predetermined value is equal to said rated current value.

5. The trip unit of claim 1 wherein said number of first frequencies is a single first frequency; wherein each of said first frequency pulses is repeated at a first rate; and wherein each of said second frequency pulses is repeated at a second rate which is different from said first rate.

6. The trip unit of claim 5 wherein said circuit structured to receive the first frequency pulses having the number of first frequencies from said conductor is a high frequency current sensor structured to sense high frequency current from the first frequency pulses having the number of first frequencies and repeated at the first rate.

7. An electrical switching apparatus comprising:
   separable contacts;
   an operating mechanism structured to open and close said separable contacts;
   a trip mechanism cooperating with said operating mechanism to trip open said separable contacts, said trip mechanism comprising:
      a current sensor structured to sense a value of current flowing through said separable contacts,
      a circuit structured to receive first frequency pulses having a number of first frequencies from a conductor in series with said separable contacts,
      a transmitter structured to transmit second frequency pulses having a second frequency to said conductor, said second frequency being different than said number of first frequencies, and
      a processor comprising a routine structured to input the sensed value of current from said current sensor, determine if the sensed value of current exceeds a predetermined value and responsively cause said transmitter to transmit the second frequency pulses having the second frequency to said conductor, monitor within a predetermined time after determining that the sensed value of current exceeds the predetermined value if a number of the first frequency pulses having the number of first frequencies is received by the circuit from said conductor, and responsively delay outputting a trip signal, and, otherwise, immediately output the trip signal.

8. The electrical switching apparatus of claim 7 wherein said processor further comprises a storage component having a number of first values defining the number of first frequencies, and a second value defining the second frequency.

9. The electrical switching apparatus of claim 7 wherein said number of first frequencies is a single first frequency; and wherein said processor further comprises a storage component having a single first value defining the single first frequency, and a second value defining the second frequency.

10. The electrical switching apparatus of claim 7 wherein said trip unit has a rated current value; and wherein the predetermined value is equal to said rated current value.

11. The electrical switching apparatus of claim 7 wherein said number of first frequencies is a single first frequency; wherein each of said first frequency pulses is repeated at a first rate; and wherein each of said second frequency pulses is repeated at a second rate which is different from said first rate.

12. The electrical switching apparatus of claim 11 wherein said circuit structured to receive the first frequency pulses having the number of first frequencies from said conductor is a high frequency current sensor structured to sense high frequency current from the first frequency pulses having the number of first frequencies and repeated at the first rate.

13. The electrical switching apparatus of claim 12 wherein the predetermined value is a first predetermined value; wherein said monitor if the number of the first frequency pulses having the number of first frequencies is received by the circuit from said conductor comprises determining if the sensed high frequency current is greater than a second predetermined value and determining if the first frequency pulses are repeated at the first rate.

14. The electrical switching apparatus of claim 13 wherein the predetermined time is a time corresponding to a predetermined count of the first frequency pulses repeated at the first rate.

15. A system comprising:
   a first branch level comprising a number of first electrical switching apparatus; and
   a second branch level downstream of said first branch level and comprising a number of second electrical switching apparatus,
   wherein each of said number of first electrical switching apparatus and said number of second electrical switching apparatus comprises:
      separable contacts,
      an operating mechanism structured to open and close said separable contacts, and
      a trip mechanism cooperating with said operating mechanism to trip open said separable contacts, said trip mechanism comprising:

a current sensor structured to sense a value of current flowing through said separable contacts, a circuit structured to receive first frequency pulses having a number of first frequencies from a conductor in series with said separable contacts, a transmitter structured to transmit second frequency pulses having a second frequency to said conductor, said second frequency being different than said number of first frequencies, and a processor comprising a routine structured to input the sensed value of current from said current sensor, determine if the sensed value of current exceeds a predetermined value and responsively cause said transmitter to transmit the second frequency pulses having the second frequency to said conductor, monitor within a predetermined time after determining that the sensed value of current exceeds the predetermined value if a number of the first frequency pulses having the number of first frequencies is received by the circuit from said conductor, and responsively delay outputting a trip signal, and, otherwise, immediately output the trip signal, wherein each corresponding one of said number of first electrical switching apparatus is structured to transmit said second frequency pulses having a same second frequency to said conductor of the corresponding one of said number of first electrical switching apparatus, wherein each corresponding one of said number of second electrical switching apparatus is structured to transmit said second frequency pulses having a same second frequency to said conductor of the corresponding one of said number of second electrical switching apparatus, and wherein the same second frequency of the corresponding one of said number of first electrical switching apparatus is different than the same second frequency of the corresponding one of said number of second electrical switching apparatus.

16. The system of claim 15 wherein the routine of said processor is further structured to provide a number of short delay, long delay and instantaneous trip functions.

17. The system of claim 15 wherein said trip unit has a rated current value; and wherein the predetermined value is equal to said rated current value.

18. The system of claim 15 wherein said number of first frequencies is a single first frequency; wherein each of said first frequency pulses is repeated at a first rate; wherein each of said second frequency pulses is repeated at a second rate which is different from said first rate; and wherein said circuit structured to receive the first frequency pulses having the number of first frequencies from said conductor is a high frequency current sensor structured to sense high frequency current from the first frequency pulses having the number of first frequencies and repeated at the first rate.

19. The system of claim 18 wherein the predetermined value is a first predetermined value; wherein said monitor if the number of the first frequency pulses having the number of first frequencies is received by the circuit from said conductor comprises determining if the sensed high frequency current is greater than a second predetermined value and determining if the first frequency pulses are repeated at the first rate.

20. The system of claim 19 wherein the predetermined time is a time corresponding to a predetermined count of the first frequency pulses repeated at the first rate.

21. The system of claim 15 wherein a third branch level downstream of said second branch level comprises a number of third electrical switching apparatus; wherein each of said number of third electrical switching apparatus comprises said separable contacts, said operating mechanism and said trip mechanism; and wherein the routine of said processor is further structured to determine if the sensed value of current exceeds the predetermined value and responsively cause said transmitter to transmit the second frequency pulses having the second frequency to said conductor, determine if the second or third branch level is a lowest branch level, and output the trip signal responsive to a number of trip curves, and, otherwise, determine whether to immediately output the trip signal.

* * * * *